United States Patent [19]

Recker

[11] 3,913,289

[45] Oct. 21, 1975

[54] CONNECTING DEVICE FOR PANEL-SHAPED MEMBERS

[76] Inventor: Bodo Recker, Peitschenweg 6, D 5190 Stolberg, Germany

[22] Filed: May 11, 1973

[21] Appl. No.: 359,518

[30] Foreign Application Priority Data
June 27, 1972 Germany.................... 7223898[U]

[52] U.S. Cl.................. 52/285; 52/753 C; 52/760; 46/31; 312/140
[51] Int. Cl.²......................................... F16B 5/06
[58] Field of Search... 52/760, 753 C, 753 J, 758 C, 52/758 D, 499, 285, 81, 665; 312/140, 111; 46/30, 31

[56] References Cited
UNITED STATES PATENTS

| | | | |
|---|---|---|---|
| 3,362,739 | 1/1968 | Staeger et al. | 52/285 X |
| 3,528,559 | 9/1970 | Miller | 52/285 X |
| 3,715,136 | 2/1973 | Yoshida | 52/285 X |

*Primary Examiner*—Frank L. Abbott
*Assistant Examiner*—Carl D. Friedman
*Attorney, Agent, or Firm*—Diller, Brown, Ramik & Wight

[57] ABSTRACT

This disclosure relates to a connecting device for connecting together a plurality of panel-shaped members at right angles to each other with the connecting device defining pairs of walls disposed at right angles in relation to one another between which a panel-shaped member may be received with the connecting device being of the type wherein it may be pushed into interlocking relationship with a plurality of panel-shaped members without the use of any special device.

13 Claims, 6 Drawing Figures

CONNECTING DEVICE FOR PANEL-SHAPED MEMBERS

This invention relates to a connecting device for connecting together a plurality of panel-shaped members in right angular relationship to one another with the connecting device defining pairs of walls disposed at right angles in relation to one another and spaced apart to define recesses for receiving the panel-shaped members, the connecting device being of a construction wherein it may be pushed into interconnecting relationship with panel-shaped members without the use of any special device.

The closest known prior art is found in German Patent No. 1,284,596 which discloses a connecting mechanism for panel-shaped members with the connecting mechanism including a one-piece device defining at least two pairs of walls connected to a base plate and selectively disposed at right angles in relation to one another or aligned with one another, which pairs of walls are spaced apart for the reception of corner portions of plate-shaped members. The reverse side of the base plate is provided with corresponding strips positioned as extensions of each pairs of walls with the width of each strip being one half the width of the spacing between the pairs of walls. Between these strips, the base plate is provided with a groove having an undercut cross section with the result that when two base plates are placed one on top of the other, there will result grooves with X or H-shaped cross section. In order to attach one of the base plates to another, suitable wedges with X or H-shaped cross section are provided for insertion in the mating grooves and thus provide a positive connection between the base plates transversely of the longitudinal axes thereof. In this manner, connecting elements of various shapes can be developed.

These prior devices, however, require a very precise formation and alignment of the grooves and wedges as well as other parts thereof. Additionally, the driving end and, more particularly, the releasing of the wedges is very cumbersome and time consuming. Also, the small wedges are easily lost. Further, the edges of the base plate defining the undercut portions of the grooves are exposed to considerable tensional stress. In addition to these deficiencies, the prior system requires a larger number of basic elements so that production is relatively expensive.

A particular disadvantage of prior connecting systems is that the base is always provided with strips projecting outwardly which hinder the mounting of the assembled plate-like members, or require some other element for effecting mounting thereof.

A principal feature of the invention is to provide a connecting apparatus or system wherein the connecting members thereof may be readily formed such as by injection molding with the connecting members or devices thereof being such that interlocking thereof with plate-like members is very simple and only a relatively small number of basic elements are required for the system.

Principally the invention consists of a connecting device for connecting together a plurality of plate-like members with the connecting device comprising a first one-piece member having a plurality of pairs of walls with the walls of each pair being in parallel relation and spaced apart a distance corresponding substantially to the thickness of plate-like members to be connected together to form a recess. The pairs of walls are connected at a preselected angle to one another with there being a selectively usable second member formed separate and apart from the first member, each recess opening through opposite ends of the first member and the second member being in the form of a closing plate closing the recesses at one end thereof, the closing plate having a pair of spaced walls extending between each adjacent pairs of walls of the first member and defining a notch for receiving a corner of a closing panel-shaped member, and there being securing means for releaseably interconnecting the first and second members.

Another feature of the invention is that each one piece member includes a base portion from which the walls of each pair of walls extend, and the base portion having an opening therethrough which is aligned with a like opening in the second member, and there being a rod which is engageable in the aligned bores for securing the first and second members together.

Still another feature of the invention is that the rod is square in cross section and each side thereof is of a width corresponding to the thickness of the plate-like members for which the device is intended.

Another feature of the invention is that the walls of each one piece member have a rounded outline so as to facilitate the progressive engagement thereof on opposite sides of a plate-like member being assembled therebetween.

It is also advantageous in that the one piece member may be utilized independently of the second member. In order to avoid a mutual twisting of two connected elements with this arrangement, it is desirable that the bore receiving the spacing rod be circular in cross section and at least the end portion of the rod be of a like cross section.

It is to be understood that when the spacing bar is utilized, irregularities in alignment of the parts can be leveled.

With the above and other objects in view that will hereinafter appear, the nature of the invention will be more clearly understood by reference to the following detailed description, the appended claims and the several views illustrated in the accompanying drawings:

IN THE DRAWINGS

Figure 1:
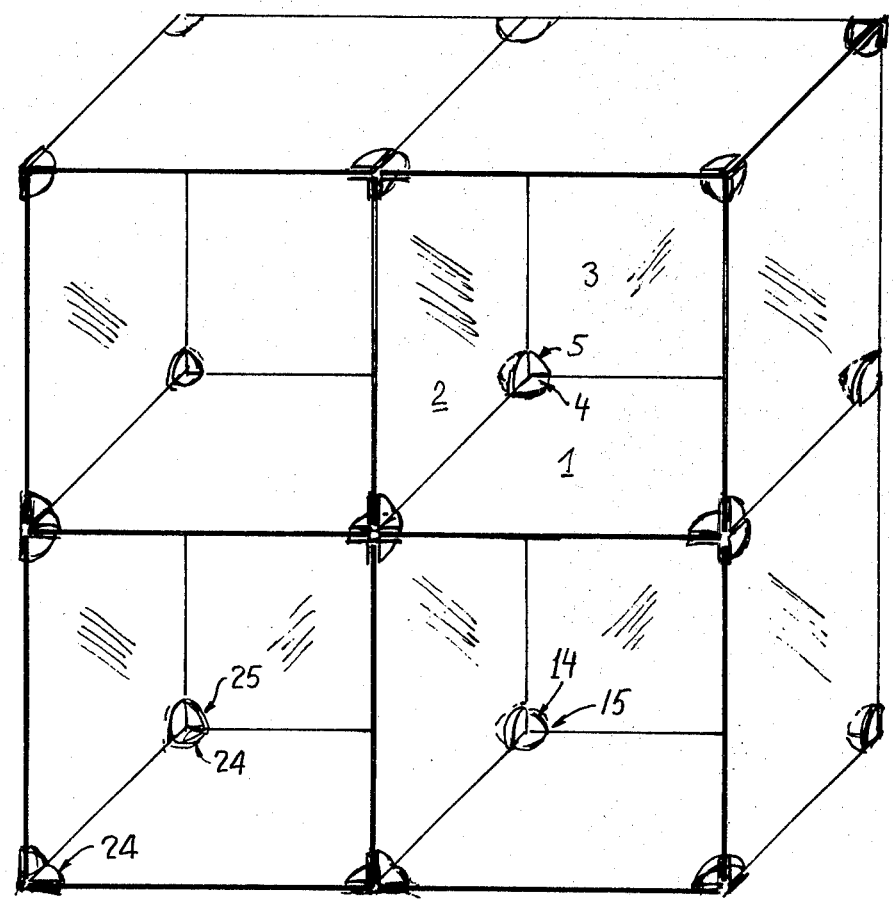
FIG. 1 is a perspective view of a spacial structure, for example, a showcase, consisting of plate-like members and connecting devices in accordance with this invention.

Referring now to the drawings, it will be seen that there is illustrated in FIG. 1 an example of a usage of the invention in the form of a shelf or showcase consisting of horizontal panel-shaped members 1, lateral panel-shaped members 2 and vertical rear panel-shaped members 3, which members are held together by corresponding connecting elements generally identified by the numerals 4, 14 and 24 engaging at their corners. These connecting elements 4, 14 and 24 can be formed of any suitable material, but are preferably formed of plastic. The connecting elements 4 have four pairs of walls, the connecting elements 14 have three pairs of walls, and the connecting elements 24 have two pair of walls and are utilized in accordance with the number of intersecting panel-shaped elements 2. Further, the connecting elements or devices 4, 14 and 24, especially in the area of the rear panel-shaped members 3, have additional closing plates 5, 15 and 25, respectively.

Figures 2, 3:
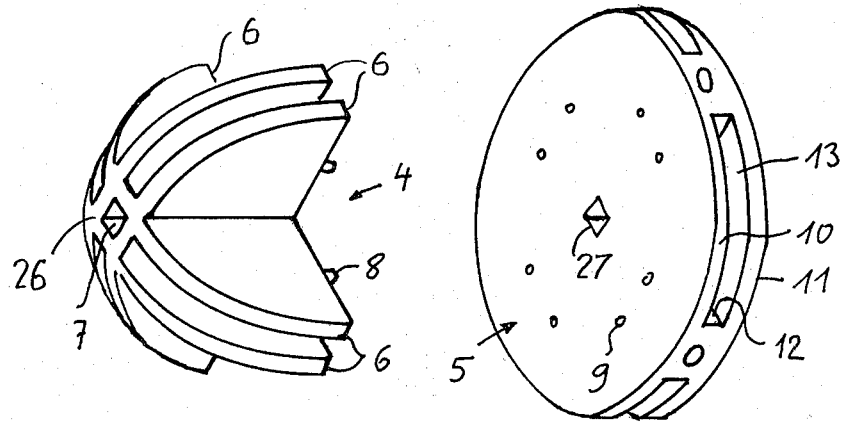
FIG. 2 is an enlarged fragmentary perspective view of a one piece member for insertion at the intersection of four plate-like members.
FIG. 3 is an enlarged perspective view of a closure plate to be utilized in conjunction with the member of FIG. 2.

Referring now to FIG. 2, it will be seen that there is illustrated the details of one of the connecting devices 4. It is to be seen that this device is of a one piece construction and includes a central hub 26 from which spaced pairs of walls 6 radiate. It is to be understood that the walls 6 are spaced apart in accordance with the thickness of the panel-shaped member which is to be received therebetween. It is also to be noted that the pairs of walls 6 are each either coplanar with one another or at right angles to one another and that the walls 6 are aligned with respective walls of the hub 26. Further, the hub 26 has formed therethrough a square cross sectional opening or bore 7 which is of the same side dimension as the spacing between adjacent walls 6 of a pair of walls and aligned therewith.

At this time it is to be noted that the side walls 6 have rounded edges so that they taper from a zero thickness at one end of the hub 26 to a maximum thickness at the opposite end thereof. This not only gives the connecting device 4 a pleasing appearance, but also facilitates the insertion thereof between a plurality of panel-shaped members.

It is to be understood that the connecting device 4 is intended to be disposed at the intersection between four panel-shaped members, as is illustrated in FIG. 1. The connecting device 4 will merely connect together four panel-shaped members disposed at right angles to each other. They will not secure in place closure panel-shaped members, such as the closure members 3. To this end there is provided the closing plate 5.

The closing plate 5, as is best shown in FIG. 3, includes two cover plates 10,11 which are connected together in spaced relation by strips 12. It is to be noted that there is one strip 12 for each pair of walls 6 and that each strip 12 is intended to be aligned with a pair of the walls 6. The strips 12 radiate from the center of the closing plate 5 and together with the cover plates 10,11 define pockets 13 which include two enclosed sides disposed at right angles to each other. The pockets 13 are of a width to receive the thickness of the closing members 3.

It is to be understood that after the vertical and horizontal members 1 and 2 have been assembled, the members 3 may be secured to the front or rear of the shelf or showcase by being at least partially assembled with the closing plate 5 and then the closing plates are assembled with their respective connecting devices. As is clearly shown in FIGS. 2 and 3, the closing plate 5 is releaseably secured to the connecting device 4 by means of a plurality of pins 8 and sockets 9. In the illustrated form of the invention, each wall 6 has a pin 8 projecting therefrom generally parallel to the hub 26. Each strip 12 is provided with a pair of apertures 9 in receiving a respective pin 8. However, the relative positions of the pins 8 and the apertures 9 may be reversed.

Figure 4:
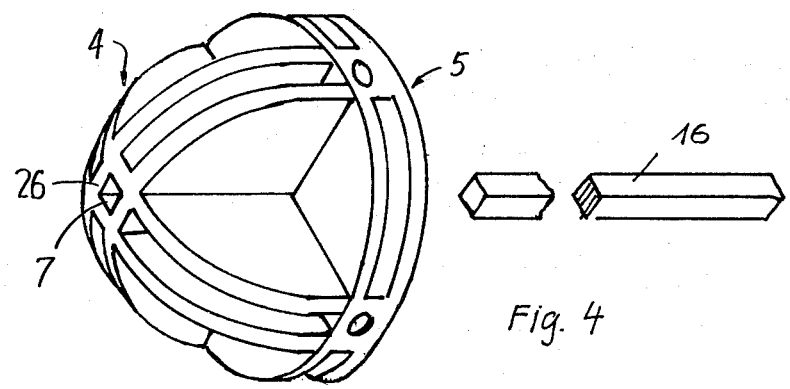
FIG. 4 is a perspective view showing the assembled one piece member and closure plate of FIGS. 2 and 3 together with a spacing bar aligned therewith for insertion in bores therein.

Reference is now made to FIG. 4 wherein it will be seen that there may be associated with either the connecting device 4 per se or the connecting device 4 having assembled therewith the closing plate 5 a spacer bar 16. The spacer bar 16 is of a cross section to be received within the opening 7 in the hub 26. The bar 16, when of sufficient length, will extend between a pair of connecting devices 4 and connect them together. At the same time, the bar 16 will function as a spacing bar so as to space adjacent portions of the members 1,2. It is further to be understood that the bar 16 could be relatively short in length and merely be utilized to interconnect the closing plate 5 with its associated connecting device 4, the closing plate 5 having a centrally located, square cross sectional opening 27 therethrough aligned with the opening 26.

At this time it is pointed out that the bore 7 and the opening 27 may be circular in cross section and at least the end portions of the spacing bar 16 may be of a similar cross section. This will permit orientation of the spacing bar 16 as may be necessary.

Figures 5, 6:
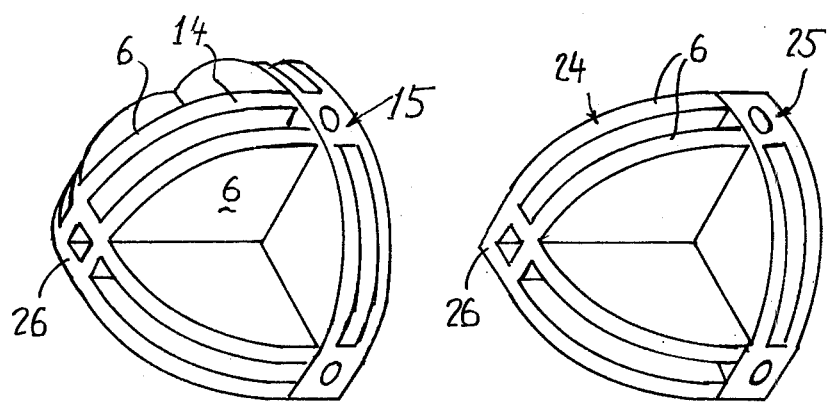
FIG. 5 is a perspective view of a one piece member having three pairs of spaced walls assembled with an associated closure plate.
FIG. 6 is a perspective view similar to FIG. 5 and shows a one piece member having only two pairs of walls and the closure plate therefor.

Reference is now made to FIG. 5 wherein there is illustrated a modified form of connecting device, identified by the numeral 14. The connecting device 14 is of the same construction as the connecting device 4 and includes a hub 26 having radiating therefrom a plurality of pair of side plates 6 which are arranged in spaced parallel relation. However, the number of pairs of side plates is limited to three with the connecting device 14 being intended to be inserted between three of the panel-shaped members 1,2.

A closing plate 15 is associated with the connecting device 14 in the same manner as is the closing plate 5 with the connecting device 4. However, the shape of the closing plate 15 is modified from that of the closing plate 5 so as to match the connecting device 14.

Referring now to FIG. 6, it will be seen that there is illustrated a further connecting device which is identified by the numeral 24. The connecting device 24 is intended to be utilized in connecting a panel-shaped member 1 at right angles to a panel-shaped member 2. Thus, the connecting device 24 has only two pairs of spaced walls 6 connected to the hub 26 thereof.

A closing plate 25 is associated with the connecting device 24. The closing plate 25, in view of the configuration of the connecting device 24 is of a quandrant outline.

It is to be understood that inasmuch as the basic constructions of the connecting devices 14 and 24 and the closing plates 15 and 25 are essentially the same as those of the connecting device 4 and the closing plate 5, a spacing bar 16 may also be utilized in conjunction therewith in the same manner as that described above.

Although only preferred embodiments of the invention have been specifically illustrated and described herein, it is to be understood that minor modifications may be made in the devices of this invention, without departing from the spirit and scope thereof, as defined by the appended claims.

I claim:

1. A connecting unit for connecting together a plurality of plate-like members, said connecting device comprising a first one-piece member having a plurality of pairs of walls with the walls of each pair being in parallel relation and spaced apart a distance corresponding substantially to the thickness of plate-like members to be connected together to form a recess and the pairs of walls being at a preselected angle to one another, a selectively usable second member formed separate and apart from said first member, each said recess opening through opposite ends of said first member and said second member being in the form of a closing plate closing said recesses at one end thereof, said closing plate having a pair of spaced walls extending between each adjacent pairs of walls of said first member and each pair of closing plate walls defining a notch for receiving a corner of a closing panel-shaped member, and securing means releaseably securing said second member to said first member with said second member engaging said member first walls at said recesses one end and closing the same.

2. The connecting unit of claim 1 wherein said first member has a hub from which said pairs of walls radiate, said hub has an axial bore, and said closing plate has a like bore aligned with said hub bore.

3. The connecting unit of claim 2 wherein a like first member is in spaced aligned relation with the first mentioned first member, and a bar extends between said first members.

4. The connecting unit of claim 3 wherein said bar is a spacer for connected adjacent panel-shaped members and has a rectangular cross section corresponding to the thickness of adjacent panel-shaped members.

5. The connecting unit of claim 4 wherein said bores in said hubs correspond to the cross section of said bar.

6. The connecting unit of claim 4 wherein said bores in said hubs are circular in cross section and at least end portions of said bar are of a like cross section.

7. The connecting unit of claim 1 wherein all of the adjacent pairs of walls of said closing plate are formed by two cover plates separated by radiating strips.

8. The connecting unit of claim 1 wherein all of the adjacent pairs of walls of said closing plate are formed by two cover plates separated by radiating strips, and the strips are of a width corresponding to the spacing between remote surfaces of said pairs of walls of said first member.

9. The connecting unit of claim 1 wherein said securing means are in the form of cooperating projecting pins and aligned recesses carried by said closing plate and said spaced parallel walls of said first member.

10. A connecting unit for connecting together a plurality of plate-like members, said connecting unit comprising separate first and second members, said second member including a pair of parallel walls, at least two spacer means extending between said parallel walls and permanently securing said parallel walls together, said parallel walls defining between said spacer means at least one pocket for a corner of a plate-like member, said first member including at least two pairs of parallel walls disposed at a fixed angle to one another and the walls of each pair being spaced apart to define a notch for receiving a corner of a plate-like member, and means releaseably securing said first member to said second member with said first member walls being in alignment with said spacer means, said first member walls being substantially normal to said second member walls.

11. A connecting unit for connecting together a plurality of plate-like members, said connecting unit comprising separate first and second members, said second member including a pair of parallel walls, at least two spacer means extending between said parallel walls and permanently securing said parallel walls together, said parallel walls defining between said spacer means at least one pocket for a corner of a plate-like member, said first member including at least two pairs of parallel walls disposed at a fixed angle to one another and the walls of each pair being spaced apart to define a notch for receiving a corner of a plate-like member, and means releaseably securing said first member to said second member with said first member walls being in alignment with said spacer means, said first member walls being substantially coextensive with respective ones of said spacers.

12. A connecting unit for connecting together a plurality of plate-like members, said connecting unit comprising separate first and second members, said second member including a pair of parallel walls, at least two spacer means extending between said parallel walls and permanently securing said parallel walls together, said parallel walls defining between said spacer means at least one pocket for a corner of a plate-like member, said first member including at least two pairs of parallel walls disposed at a fixed angle to one another and the walls of each pair being spaced apart to define a notch for receiving a corner of a plate-like member, and means releaseably securing said first member to said second member with said first member walls being in alignment with said spacer means, said first member walls having free edges lying in a common plate and in abutment with one wall of said second member.

13. The connecting unit of claim 12 wherein a portion of said second member one wall is in alignment with the space between each pair of walls of said first member and forms a closing plate therefor.

* * * * *